United States Patent Office 2,921,431
Patented Jan. 19, 1960

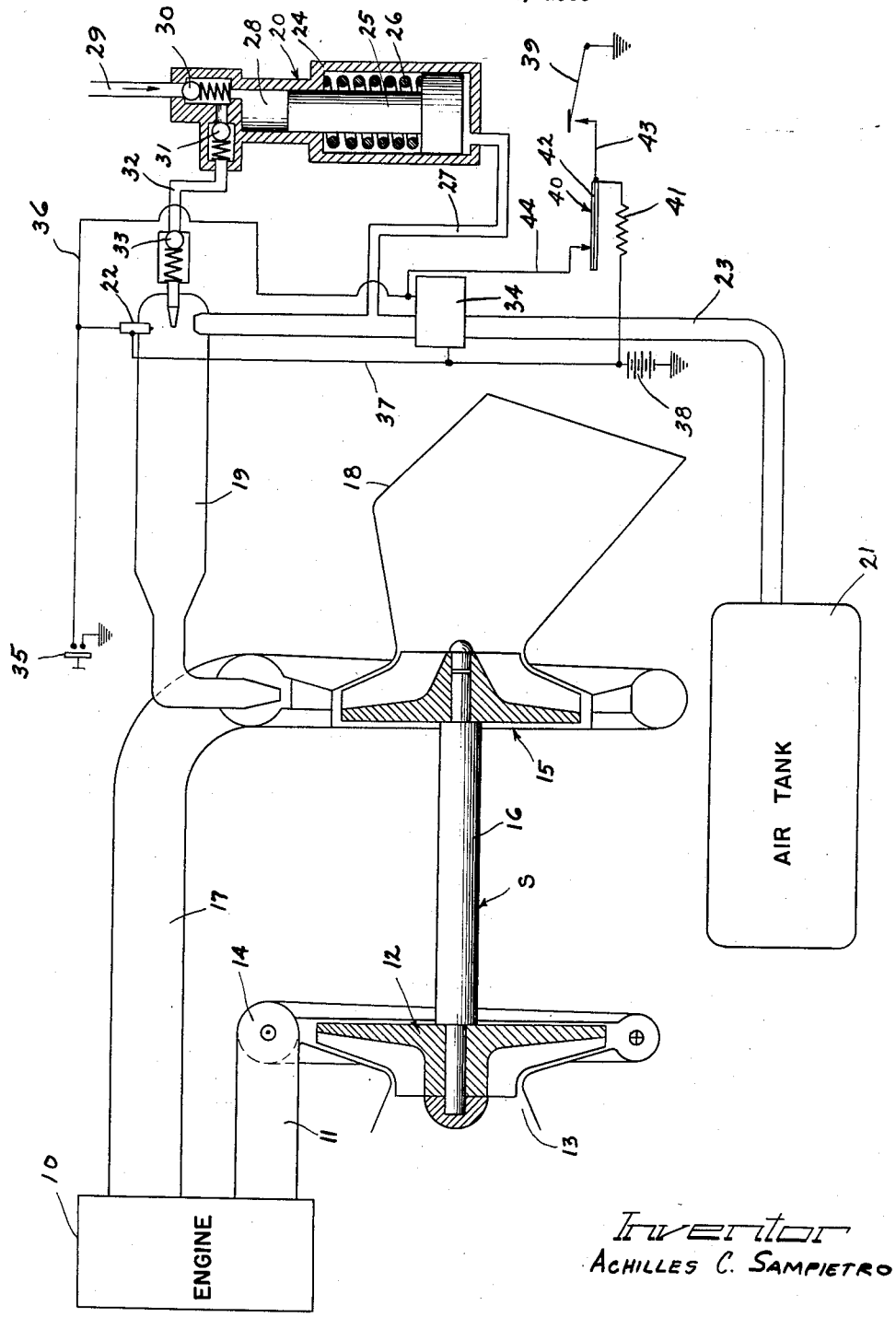

2,921,431

ENGINE TURBOSUPERCHARGER SYSTEM

Achilles Charles Sampietro, Detroit, Mich., assignor to Thompson Products, Inc., Cleveland, Ohio, a corporation of Ohio Application November 1, 1955, Serial No. 544,141

3 Claims. (Cl. 60—13)

This invention relates to improvements in engine turbosupercharger systems for internal combustion engines, and more particularly to means for independently driving a turbosupercharger while starting an engine or during rapid acceleration thereof. The present invention is particularly useful on two cycle engines, such as diesel engines, although other uses and purposes may be apparent to one skilled in the art.

Heretofore, difficulties have been encountered in starting a two cycle engine equipped with an exhaust driven turbosupercharger, inasmuch as there was no pressure differential to scavenge the cylinders of the engine.

Also, it is well known that two cycle engines in the past, upon a quick acceleration and loading of the engine, expel a smoky exhaust which is caused by an over-rich mixture in the cylinders. Such a smoky exhaust, when caused by urban busses, is undesirable and constitutes a "smog" helping element.

Accordingly, it is an object of this invention to provide an improved engine turbosupercharger system for internal combustion engines.

Another object of this invention resides in the provision of a turbosupercharger system for internal combustion engines having auxiliary means for driving the turbosupercharger that improves starting conditions of the engine.

A further object of this invention is to provide a turbosupercharger for internal combustion engines having auxiliary means for driving the turbosupercharger which decreases the chances of having an over-rich mixture in the engine when subjecting the engine to rapid acceleration and suddenly applied loads.

Still another object of this invention is to provide a turbosupercharger system driven by exhaust gases of an internal combustion engine including auxiliary means for supplying gases to the turbosupercharger.

A further object of this invention resides in the provision of a turbosupercharger unit for internal combustion engines which is normally driven by the exhaust gases of the engine, and which is provided with an auxiliary combustion chamber for driving the turbosupercharger during starting of the engine or during periods of rapidly accelerating the engine.

It is also an object of this invention to provide an auxiliary means for driving a turbosupercharger on an internal combustion engine which includes a combustion chamber and means for supplying a limited quantity of fuel and air to the combustion chamber for ignition to produce high velocity gases.

Other objects, features and advantages of the invention will be apparent from the following detailed disclosure, taken in conjunction with the accompanying sheet of drawings, wherein like reference numerals refer to like parts, in which:

On the drawings:

The single figure is a diagrammatic view of a turbosupercharger system embodying the invention.

As shown on the drawings:

Inasmuch as the present invention is particularly useful in association with two cycle engines, such as diesel engines, in the drawing, the reference numeral 10 illustrates diagrammatically a two cycle internal combustion engine. But it is to be understood that the invention may also be associated with other types of internal combustion engines.

Compressed air is supplied to the engine 10 through a conduit 11 by a compressor or blower 12 of a turbosupercharger set S. The scavenging or charging blower 12 includes an inlet or air intake 13 and an air discharge outlet 14 connected to the conduit 11 which delivers the air to the intake manifold of the engine. The compressor 12 is driven by a centripetal exhaust gas turbine 15 through the medium of a connecting shaft 16. For powering the exhaust gas turbine 15, exhaust gases are received from the exhaust manifold of the engine 10 through a conduit 17, and the turbine 15 is provided with an exhaust gas outlet 18. While the compressor 12 is shown as a centrifugal compressor and the turbine 15 is shown as a centripetal turbine, it will be understood that any other suitable type compressor or blower and turbine may be employed in this turbosupercharger set S.

An auxiliary means for driving the turbosupercharger set S which improves the starting characteristics of the engine 10 and decreases the chances of having an over-rich mixture in the engine cylinders when rapidly accelerating includes generally a combustion canister or chamber 19, a fuel charger 20, a compressed air tank 21 for feeding an air supply to the combustion can 19 and for driving the fuel charger 20, and an igniter 22.

The discharge end of the combustion chamber 19 leads to the centripetal turbine 15 of the turbosupercharger set S.

In installations where the present invention will be associated with a two cycle engine, the installation will be large enough to have a compressed air tank designated by the numeral 21, such as in large vehicles. The present invention takes the air from the tank 21, increases its volume by heating it, and allows the combustion products to expand through the starting nozzles in the turbine section of the turbosupercharger S. A suitable conduit 23 leads from the air tank 21 to the combustion can 19. Preferably, the air is directed into the combustion chamber 19 in a tangential direction.

The fuel charger 20 is employed to supply the fuel nozzles in the combustion chamber burner with a pressurized charge of fuel, and includes a casing 24 enclosing a differential piston 25 that is urged in one direction against the bias of a spring 26. The fuel charger 20 is pneumatically operated by the compressed air from the tank 21 which is directed to the underside of the differential piston 25 through a branch conduit 27 which connects to the main conduit 23. A fuel chamber 28 above the differential piston 25 is maintained with fuel from a line 29 which leads to a regular fuel pump (not shown) that is continuously operating when the ignition of the engine is turned on. The fuel passes through a check valve 30 and into the chamber 28. Upon actuation of the differential piston 25, the biasing of a discharge check valve 31 is overcome and the fuel is directed through a conduit or line 32 intercommunicating the fuel charger with the fuel nozzles of the combustion chamber 19. A second check valve 33 is positioned in the line 32 which also prevents the backflow of fuel to the fuel charger 20. The spring pressure exerted against the outlet check valve 31 at the fuel charger 20 is such that the valve 31 cannot be opened by the pressure of the fuel pump which replenishes the fuel chamber 28 of the fuel charger. The valve 31 can only be unseated by the pressure exerted by the differential piston 25.

To control the air flow into the combustion chamber and the actuation of the fuel charger 20 by the compressed air tank 21, a solenoid valve 34 is positioned in the conduit 23 and is normally in closed position. It is to be understood that the jets of fuel from the burner in the combustion chamber are directed so as to mix properly with the swirling air and the mixture passes the electric igniter which is energized simultaneously.

In starting the engine 10, it is desirable to scavenge the cylinders of the engine for easier starting thereof, and the activation of the independent combustion chamber 19 achieves this result by driving the turbosupercharger set S.

In starting of the engine 10, the combustion chamber 19 is activated by pressing the starter button of the engine, which is indicated by the numeral 35. It is noted that one side of each of the starter switch 35, the igniter 22, and the solenoid valve 34 is connected together by a common conductor 36, while the other side of the starter switch 35 is connected to ground and the other side of the igniter and solenoid valve 34 are connected to ground through a common conductor 37 and a conventional battery 38. On opening of the solenoid valve 34, compressed air is delivered to the combustion chamber 19 through the conduit 23 and to the fuel charger 20. Upon admitting the compressed air to the underside of the differential piston 25, the resistance of the return spring 26 is overcome and the differential piston forces a limited quantity of fuel at considerable pressure to the nozzles in the burner of the combustion chamber 19. Hence, fuel and air are supplied simultaneously to the combustion chamber 19 along with the energization of the igniter 22. As soon as the engine fires, the starter button 35 is released to open the circuit and effectively turn off the combustion chamber operation. The exhaust gases from the engine then take over and drive the turbosupercharger set S. In other words, initially, the turbosupercharger set S is driven by the combustion chamber 19 to scavenge the cylinders in the engine 10.

In case of a false start, the operator must delay at least long enough to allow the fuel charger to assume its normal position. In such a case, the differential piston 25 is retracted by the return spring 26. Inasmuch as the chamber on the underside of the differential piston 25 is momentarily filled with compressed air, which is discharged through the line 27 and into the conduit 23 to the combustion chamber 19, a time lag or dash pot effect on the differential piston is effected. Since the fuel pump will be continually running, the fuel chamber 28 in the fuel charger 20 will be immediately replenished as the piston 25 is retracted to its normal position. After the piston 25 has returned, the solenoid valve 34 and the igniter 22 may be again energized to activate the combustion chamber 19 and drive the turbosupercharger set S.

The auxiliary means for boosting the output of the turbosupercharger set S is also useful where the engine 10 is subjected to sudden loading as by rapid acceleration. Normally, in such cases, an over-rich mixture in the cylinders of the engine is not completely burned and is thus exhausted as a smoky exhaust. It is especially desirable to reduce this smoky exhaust, from engines used in urban busses, as it will decrease the amount of "smog" helping elements. Also, the efficiency of the engine will be enhanced.

In such a situation, an accelerator pedal is diagrammatically illustrated at 39, which when depressed a predetermined amount closes a circuit including the solenoid valve 34, the igniter 22, and a thermal break switch 40. The thermal break switch includes a heating element 41 which bows or bends a bimetal strip 42 and breaks the circuit after a predetermined time has lapsed. Of course, while the circuit is closed, the combustion chamber 19 will be supplied with a mixture of fuel and air from the fuel charger 20 and the tank 21 which will be ignited by the igniter 22 to boost the output of the turbosupercharger S, and increase the supply of compressed air to the engine cylinders. The switch on the accelerator pedal 39 will of course be normally open. It will be noted that when this circuit is closed, the heating element 41 is connected on one side to ground through a conductor 43 and the accelerator switch, and on the other side to the battery 38 and ground. And the igniter 22 and the solenoid valve 34 are connected on one side to the battery 38 and ground through the common conductor 37 and on the other side to ground through the conductor 36, a conductor 44, the thermal break switch 40, and the switch on the accelerator pedal 39.

From the foregoing, it is seen that the present invention provides an improved means for starting a two cycle engine equipped with a turbosupercharger and means for decreasing the chances of having an over-rich mixture in the engine during rapid acceleration.

It will be understood that modifications and variations may be effected without departing from the scope of the novel concepts of the present invention, but it is understood that this application is to be limited only by the scope of the appended claims.

I claim as my invention:

1. In an engine assembly including an internal combustion engine, a supercharger for said engine, engine exhaust gas driving means for said supercharger, a source of electric energy, a starter switch for said engine, and a throttle switch for said engine, the improvements which comprise an auxiliary combustion device having an air inlet, a fuel inlet, an igniter and an exhaust outlet, means connecting said exhaust outlet with said means for driving said supercharger, a fuel source, a compressed air source, an electrically energized valve controlling air and fuel flow from said sources to said air and fuel inlets respectively, circuitry connecting the starter switch, the igniter and the throttle switch with the electric source and the valve to open the valve and energize the igniter when either the throttle switch or the starter switch is closed whereby the auxiliary combustion device will supply gases to the driving means for the supercharger, a thermal break switch between the throttle switch and the valve to close the valve when the break switch is opened, and a heater for said break switch energized when said throttle switch is closed to open the break switch.

2. In an engine assembly including an internal combustion engine, a supercharger for said engine, engine exhaust gas driving means for said supercharger, a source of electric energy, a starter switch for said engine, and a throttle switch for said engine, the improvements which comprise an auxiliary combustion device having an air inlet, a fuel inlet, an igniter and an exhaust outlet, means connecting said exhaust outlet with said means for driving said supercharger, a fuel source, a compressed air source, an electrically energized valve controlling air and fuel flow from said sources to said air and fuel inlets respectively, circuitry connecting the starter switch, the igniter and the throttle switch with the electric source and the valve to open the valve and energize the igniter when either the throttle switch or the starter switch is closed whereby the auxiliary combustion device will supply gases to the driving means for the supercharger, and means energized when the throttle switch is closed for opening the throttle switch after a predetermined time lapse for de-energizing the igniter and valve.

3. In an engine assembly including an internal combustion engine having a starter switch and a throttle control, a turbosupercharger operated by exhaust gases from the engine for supplying compressed air to the engine, a source of electric energy, and means for supplying the internal combustion engine with fuel under pressure, the improvements which comprise an auxiliary combustion device for driving said turbosupercharger, said auxiliary combustion device having an air inlet, a fuel inlet, an igniter, and an exhaust outlet, a pneumatically operated fuel charger having a chamber receiving fuel under pressure from said means for supplying fuel to the internal combustion engine, a piston in said chamber for delivering fuel from the chamber to the fuel inlet of the auxiliary combustion device, a compressed air source, an electrically energized valve controlling air flow from said source to said air inlet of the auxiliary combustion device and to said piston, circuitry connecting the starter switch, the throttle control, and the igniter with the electric source and the valve to open the valve and energize the igniter when either the throttle control or the starter switch is closed whereby the piston will be energized to deliver fuel to the fuel inlet of the auxiliary combustion device to admix with the air fed by the valve to the air inlet of said auxiliary combustion device and to become ignited by the igniter energized from the electric source for supplying gases to drive the turbosupercharger during starting or rapid acceleration of the engine, and means for de-energizing the throttle control to close the valve and de-energize the igniter after a predetermined time lapse.

References Cited in the file of this patent

UNITED STATES PATENTS

| | | |
|---|---|---|
| 841,972 | Huber | Jan. 22, 1907 |
| 1,893,127 | Buchi | Jan. 3, 1933 |
| 2,100,092 | Tear | Nov. 23, 1937 |
| 2,379,455 | Prince | July 3, 1945 |
| 2,608,051 | Nettel | Aug. 26, 1952 |
| 2,742,758 | Kelly | Apr. 24, 1956 |

FOREIGN PATENTS

| | | |
|---|---|---|
| 620,376 | Great Britain | Mar. 23, 1949 |

UNITED STATES PATENT OFFICE

CERTIFICATE OF CORRECTION

Patent No. 2,921,431　　　　　　　　　　　　　　　　　January 19, 1960

Achilles Charles Sampietro

It is hereby certified that error appears in the above numbered patent requiring correction and that the said Letters Patent should read as corrected below.

In the grant, lines 2 and 3, for "assignor to Thompson Products, Inc., of Cleveland, Ohio," read -- assignor to Thompson Ramo Wooldridge Inc., --; line 12, for "Thompson Products, Inc., its successors" read -- Thompson Ramo Wooldridge Inc., its successors --; in the heading to the printed specification, lines 3 and 4, for "assignor to Thompson Products, Inc., Cleveland, Ohio," read -- assignor to Thompson Ramo Wooldridge Inc., --.

Signed and sealed this 14th day of June 1960.

(SEAL)
Attest:

KARL H. AXLINE
Attesting Officer

ROBERT C. WATSON
Commissioner of Patents